US011021006B2

(12) United States Patent
Streichardt

(10) Patent No.: US 11,021,006 B2
(45) Date of Patent: Jun. 1, 2021

(54) EDGE PROFILE FOR A SHEET-LIKE MATERIAL, AND SHEET-LIKE MATERIAL

(71) Applicant: Fritz EGGER GmbH & Co. OG, St. Johann in Tirol (AT)

(72) Inventor: Thomas Streichardt, Warendorf (DE)

(73) Assignee: Fritz Egger GmbH & Co. OG, St. Johann in Tirol (AT)

( * ) Notice: Subject to any disclaimer, the term of this patent is extended or adjusted under 35 U.S.C. 154(b) by 0 days.

(21) Appl. No.: 15/766,468

(22) PCT Filed: Aug. 2, 2016

(86) PCT No.: PCT/EP2016/068357
§ 371 (c)(1),
(2) Date: Apr. 6, 2018

(87) PCT Pub. No.: WO2017/067683
PCT Pub. Date: Apr. 27, 2017

(65) Prior Publication Data

US 2018/0297394 A1 Oct. 18, 2018

(30) Foreign Application Priority Data

Oct. 22, 2015 (DE) ..................... 10 2015 118 055.3

(51) Int. Cl.
*B29C 48/17* (2019.01)
*B44C 5/04* (2006.01)
(Continued)

(52) U.S. Cl.
CPC .............. *B44C 5/04* (2013.01); *A47B 96/201* (2013.01); *B29C 48/07* (2019.02); *B29C 48/16* (2019.02);
(Continued)

(58) Field of Classification Search
CPC ..... Y10T 428/24868; Y10T 428/24876; Y10T 428/24802; B32B 37/153; B32B 38/145;
(Continued)

(56) References Cited

U.S. PATENT DOCUMENTS 5,989,657 A 11/1999 Wurz et al.
8,603,610 B2 12/2013 Kramer et al.
(Continued)

FOREIGN PATENT DOCUMENTS

CN 101903184 A 12/2010
CN 202391044 U 8/2012
(Continued)

OTHER PUBLICATIONS

Google patents machine translation of DE10104296C2 retrieved Dec. 2019. (Year: 2019).*
(Continued)

*Primary Examiner* — Alexander S Thomas
(74) *Attorney, Agent, or Firm* — The Webb Law Firm

(57) ABSTRACT

The present invention relates to an edge profile for a sheet-like material including a layered structure with a main body made of plastic which has a first base colour tone, with a decorative base material which has a second base colour tone, and with a decorative print. A final decoration which has a third base colour tone is formed at least from decorative base material and decorative print together. The decorative base material is a layer arranged between main body and decorative print. For easier production, the invention proposes that the decorative base layer is a layer of plastic co-extruded with the main body. The invention also relates to a sheet-like material with a corresponding edge profile.

19 Claims, 3 Drawing Sheets

2a 11 3 1 4 5 6 10 2 2c 7

(51) Int. Cl.

| | |
|---|---|
| ***B29C 48/07*** | (2019.01) |
| ***B29C 48/21*** | (2019.01) |
| ***A47B 96/20*** | (2006.01) |
| ***B32B 21/02*** | (2006.01) |
| ***B32B 21/08*** | (2006.01) |
| ***E04C 2/16*** | (2006.01) |
| ***B32B 27/36*** | (2006.01) |
| ***B32B 27/30*** | (2006.01) |
| ***B32B 27/28*** | (2006.01) |
| ***B32B 21/00*** | (2006.01) |
| ***B29C 48/16*** | (2019.01) |
| ***B32B 7/12*** | (2006.01) |
| ***E04C 2/38*** | (2006.01) |
| ***B32B 7/00*** | (2019.01) |
| ***B32B 27/32*** | (2006.01) |
| ***B32B 27/08*** | (2006.01) |
| *B29K 101/12* | (2006.01) |
| *B29L 31/00* | (2006.01) |

(52) U.S. Cl.

CPC ................ *B29C 48/21* (2019.02); *B32B 7/00* (2013.01); *B32B 7/12* (2013.01); *B32B 21/00* (2013.01); *B32B 21/02* (2013.01); *B32B 21/08* (2013.01); *B32B 27/08* (2013.01); *B32B 27/28* (2013.01); *B32B 27/30* (2013.01); *B32B 27/304* (2013.01); *B32B 27/308* (2013.01); *B32B 27/32* (2013.01); *B32B 27/36* (2013.01); *E04C 2/16* (2013.01); *E04C 2/38* (2013.01); *E04C 2/388* (2013.01); *B29K 2101/12* (2013.01); *B29K 2995/0021* (2013.01); *B29L 2031/003* (2013.01); *B32B 2307/40* (2013.01); *B32B 2307/402* (2013.01); *B32B 2307/404* (2013.01); *B32B 2307/4026* (2013.01); *B32B 2307/412* (2013.01); *B32B 2451/00* (2013.01)

(58) Field of Classification Search

CPC .......... B32B 2307/404; B32B 2451/00; B05D 5/066; B44F 1/08; B29C 48/17; B29C 48/18; B29C 48/21; B29C 48/49; B29C 48/255

See application file for complete search history.

(56) References Cited

U.S. PATENT DOCUMENTS

| | | | |
|---|---|---|---|
| 9,193,153 B2 | 11/2015 | Kuhnberger et al. | |
| 2006/0181760 A1 | 8/2006 | Hoeing | |
| 2008/0118713 A1 | 5/2008 | Bordener | |
| 2009/0317649 A1* | 12/2009 | Smith | B32B 27/08 428/516 |
| 2011/0045254 A1 | 2/2011 | Kuhnberger et al. | |
| 2011/0127892 A1 | 6/2011 | Joachimmeyer et al. | |
| 2013/0273336 A1* | 10/2013 | Kuhnberger | B44C 1/00 428/195.1 |
| 2017/0367482 A1 | 12/2017 | Petrakis et al. | |

FOREIGN PATENT DOCUMENTS

| | | | |
|---|---|---|---|
| CN | 104015324 | A | 9/2014 |
| CN | 204351391 | U | 5/2015 |
| CN | 104669732 | A | 6/2015 |
| DE | 8700536 | U1 | 3/1987 |
| DE | 19701594 | A1 | 7/1998 |
| DE | 10104296 | A1 | 8/2002 |
| DE | 102006006611 | A1 | 9/2007 |
| DE | 202007011911 | U1 | 2/2009 |
| DE | 202007014991 | U1 | 4/2009 |
| DE | 102008010738 | A1 | 6/2009 |
| DE | 102011104980 | A1 | 12/2012 |
| DE | 202015100800 | U1 | 4/2015 |
| DE | 202015104158 | U1 | 9/2015 |
| EP | 0857442 | B1 | 10/1997 |
| EP | 1163864 | A1 | 12/2001 |
| EP | 1688302 | B1 | 8/2006 |
| EP | 1852242 | A1 | 11/2007 |

OTHER PUBLICATIONS

DIN EN ISO 11664-4; Jun. 2012; 13 pages; Reference is relevant for reasons listed in Appendix.

DIN EN ISO/CIE 11664-4; Mar. 2020; 17 pages; Reference is relevant for reasons listed in Appendix.

Raukantex duo-color-Programmvielfalt in Starken and Farben; Apr. 1987; 1 page; Reference is relevant for reasons listed in Appendix.

Raukantex Galerie edler Kanten; Apr. 1995; 36 pages; Reference is relevant for reasons listed in Appendix.

Raukantex Duo-Color Effekt Durch Kontrast; May 2009; 2 pages; Reference is relevant for reasons listed in Appendix.

Raukantex Duo-Color Effekt Durch Kontrast; Apr. 2011; 2 pages; Reference is relevant for reasons listed in Appendix.

* cited by examiner

EDGE PROFILE FOR A SHEET-LIKE MATERIAL, AND SHEET-LIKE MATERIAL

CROSS-REFERENCE TO RELATED APPLICATIONS

This application is the United States national phase of International Application No. PCT/EP2016/068357 filed Aug. 2, 2016, and claims priority to German Patent Application No. 10 2015 118 055.3 filed Oct. 22, 2015, the disclosures of which are hereby incorporated in their entirety by reference.

BACKGROUND OF THE INVENTION

Field of the Invention

The present invention relates to an edge profile for a sheet-like material comprising a layered structure with a main body made of plastic, which has a first base colour tone, and with a decorative base material, which has a second base colour tone, and with a decorative print, wherein a final decoration which has a third base colour tone is formed at least from decorative base material and decorative print together, wherein the decorative base material is a layer arranged between main body and decorative print. The invention also relates to a sheet-like material with a top, a bottom and at least one narrow side.

Description of Related Art

Sheet-like materials are in particular wood-based panels, by way of example chipboard, fibreboard or OSB (oriented strand board), compact board (high-pressure laminate board according to European Standard EN 438 parts 1 to 7) or plastic sheets, by way of example sheets of thermoplastic or duroplastic plastics. Such sheets are often provided on the narrow surfaces (side edges) with plastic edge profiles. Here, the edge profiles are bonded to the narrow sides of the sheet or welded to these, e.g. by laser or hot air methods (referred to as edging). The edge profiles serve firstly as a visually attractive finish for these sheets and secondly also as protection for the narrow sides against impacts or the ingress of moisture.

Edge profiles of the abovementioned kind are manufactured according to the prior art by initially producing a main body (substrate) made of plastic by extrusion and then providing this main body with a number of separate layers, including at least two layers which together form a final decoration. It is often desired that the final decoration matches as closely as possible the decoration of the sheet on its top and/or bottom, which can also be formed by a separate coating of the sheet.

Here, the main body can already be extruded in a width, which is normally between 1 and 4 mm wider than the narrow side of the sheet. It is also known to produce an extrudate that is many times wider and to then divide this lengthways into a number of main bodies (calendering).

The layered structure applied to the main body has, by way of example, a decorative base material and a decorative print arranged on this. Between the decorative base material and the decorative print, a background, known as a colour-receiving layer, can also be arranged. Between the decorative base material and the main body, a primer is provided. As the finishing coat a further protective lacquer is finally provided on the decorative print.

In the abovementioned layered structure, an important criterion is that the decorative base material is normally brighter (has greater brightness) than the final decoration, which results from overlaying the decorative base material and decorative print.

Since edge profiles are typically applied with a certain overhang on the narrow sides of the sheet and then the overhang is removed on the top and/or bottom by contour milling and/or cutting, in order to match the edge profile to the actual width of the narrow side, a cut edge necessarily arises on the top and/or bottom of the edge profile, on which the base colour tone of main body is visible. In order that on the finish-edged sheet no colour difference is later noticeable between the main body of the edge profile and the final decoration, which normally corresponds to the decoration of the sheet, it is known to match the base colour tone of the extruded main body to the base colour tone of the final decoration.

A problem with the prior art is that the multi-layering of primer, decorative base material, background (colour-receiving layer), decorative print and protective lacquer has quite a complex structure. Here the primer and background have to be matched to the decorative print and the desired final decoration. The mechanical properties (such as for example the surface hardness, elongation at break or tensile strength, etc.) of the plastic edge profiles are altered by the multi-layer structure. This alteration generally has a negative effect on the processing of the edge profile.

SUMMARY OF THE INVENTION

On this basis, an object of the present invention is to specify an edge profile and an edged sheet-like material, which is or are easier to produce.

The object derived and presented above is achieved according to a first teaching of the present invention with an edge profile for a sheet-like material, in particular for a wood-based, compact or plastic sheet, comprising a layered structure

- with a main body made of plastic, which (at least in sections) has a first base colour tone,
- with a decorative base material, which (at least in sections) has a second base colour tone, and
- with a decorative print, wherein a final decoration, which has a third base colour tone, is formed at least from decorative base material and decorative print, possibly also from the main body and/or further layers between decorative base material and decorative print, wherein the decorative base material is a layer arranged between main body and decorative print, in that the decorative base material is a layer made of plastic coextruded with the main body.

"At least in sections" means that at least one section of the respective layer (main body, decorative base material, decorative print etc.) has a base colour tone, wherein the sections with the respective base colour tone of the individual layers overlay one another transversally to the orientation of the layers. Preferably, however, not just a section, but in each case the entire layer has a uniform base colour tone.

"Base colour tone" means the colour tone of a surface that occurs most frequently per unit of area. "Colour tone" denotes one of the basic characteristics defining a colour. Further basic characteristics are "brightness" and "colour saturation". The colour tone denotes a certain shading of a colour. A colour can have a number of shades or colour tones. By way of example, there are various shades or colour tones of the colour blue or the colour red. If a surface predominantly has one and the same shade of red and has a black pattern, wherein the colour black covers (takes up) a smaller portion of the surface than the red colour tone, the red colour tone is the base colour tone of the surface.

The final decoration results from overlaying individual layers which cover each other at least in part, at least from overlaying decorative base material and decorative print. The final decoration may also be the result of overlaying main body, decorative base material and decorative print, if for instance the decorative base material does not provide full coverage and the main body or its base colour tone shows through. Preferably, however, the decorative base material provides full coverage so that the main body or its base colour tone does not show through. Any layers that may be present between decorative base material and decorative print can be a component of the final decoration, e.g. the final decoration then results from overlaying main body, decorative base material, decorative print and the layer(s) present between decorative base material and decorative print. The (third) base colour tone of the final decoration is accordingly the result of overlaying the base colour tones of the respective layers covering each other at least in sections, at least of overlaying the base colour tones of decorative base material and decorative print, possibly also by overlaying the base colour tones of main body, decorative base material and decorative print (if the decorative base material does not provide full coverage and the base colour tone of the main body shows through) or also by overlaying the base colour tones of main body, decorative base material, decorative print and the layer(s) present between decorative base material and decorative print.

"Coextruded" means that this layer (the decorative base material) together with the main body forms a single extrudate. The extrudate comprising the decorative base material and the main body has already emerged as a single piece from the extrusion die during the extrusion process. Here, in the direction of flow before the extrusion the two layers (decorative base material and main body) are in particular directly combined as a melt, that is to say that in the subsequent one-piece extrudate the two layers are arranged immediately next to one another.

Because main body and decorative base material form a one-piece extrudate, between main body and decorative base material a primer no longer needs to be arranged as a separate layer. The structure of the edge profile is therefore very much simpler, since in the simplest case the layered structure only has the extrudate and the decorative print immediately on this as a further layer. So, there is no need, either, to select an optimum primer as a function of the decorative print. It is also advantageous that mechanical characteristic values of the main body are altered significantly less (normal coatings can result in embrittlement or altered surface hardness, and so on). A further advantage is also that recycling of production waste is optimised, since the coextruded layer continues to be thermoplastic (unlike conventional layers, which adopt duroplastic properties due to chemical wetting reactions). Another advantage is that through coextrusion with other or modified plastics the possibility arises of optimising the wetting performance and/or the bonding of the subsequent layers (in a conventional mono-extrusion such plastics or modifications generally cannot be used for economic reasons).

As explained in the following, in addition the edge profile of the invention ensures that between the layer forming the main body and the layer forming the decorative print a layer is arranged, having a greater brightness than the final decoration. This layer with the greater brightness is said coextruded layer, forming the decorative base material. In particular, here the main body and the decorative base material can have a different base colour tone and the base colour tone of the main body can in particular be matched to the base colour tone of the final decoration. Therefore, as in the prior art, it is also possible with the edge profile of the invention, to extrude base profiles (profiles with main body and decorative base material) individually or as an extrudate to be separated later and then to match the definitive profile following application to the narrow side of the sheet-like material by shortening on the top or bottom side to the actual width of the narrow side, wherein then also in particular no significant differences exist in the base colour tone of the main body visible at the cut edge and in the base colour tone of the final decoration and/or decoration of the sheet-like material.

In the following various configurations of the edge profile of the invention are now described.

According to one configuration of the edge profile of the invention, the decorative base material coextruded with the main body has a layer thickness, in particular an average layer thickness, in a range of 3-500 μm, preferably in a range of 5-100 μm, particularly preferably in a range of 5-30 μm. Because the decorative base material is coextruded, this can be manufactured in a simple manner in relatively small thicknesses and furthermore also particularly uniformly across its length (having a particularly uniform thickness). As a result of the coextrusion, there is no danger either of the decorative base material separating from the main body, which in the prior art was a real possibility over time if an unsuitable primer was used between the decorative base material and main body. Furthermore, the mechanical properties of the main body are also retained since this is not directly coated with a primer.

According to a further configuration of the edge profile of the invention it is provided that the colour distance between the first base colour tone and the second base colour tone and/or the colour distance between the second base colour tone and the third base colour tone is in a range of 2-8 $\Delta E$ (Delta E), preferably in a range of 2-5 $\Delta E$, particularly preferably in a range of 2.5-4 $\Delta E$. As already indicated above, the second base colour tone (base colour tone of the decorative base material) and the first base colour tone (base colour tone of the main body) and/or the second base colour tone and the third base colour tone (base colour tone of the final decoration) can differ from one another. The difference is defined by what is known as the colour distance, also referred to as colour difference. This relates to the Euclidean distance between the colour values (colour tones in the L*a*b* colour space or CIELAB colour space). According to the L*a*b* colour system (CIELAB colour system), defined in European standard EN ISO 11664-4, each colour tone of each colour has, in the L*a*b* colour space, a colour location precisely defined by three Cartesian coordinates (L*, a*, b*), wherein on the a*-axis green and red are opposite each other, on the b*-axis blue and yellow are opposite each other and the L*-axis defines the brightness (luminance).

As explained above, the respective layer (main body, decorative base material, decorative print etc.) has at least in a section of its surface, preferably even over its entire surface, a base colour tone. These surfaces or sections of surface with a base colour tone are overlaid vertically to the orientation of the layers, wherein through the overlaying of the surfaces or sections of surface of by way of example decorative base material and decorative print the third base colour tone results. Since within a section of surface containing the respective colour tone the base colour tone may fluctuate to some extent within tolerance, the colour distance defined above always means the average value in relation to the entire section of surface containing the respective base colour tone of the two sections of surface compared with one another. The same also applies in the event that the entire surface of at least one of the layers has a uniform base colour tone, which can fluctuate to some degree within the entire surface. The colour distance defined above is in this case always the average value in relation to the entire surface, containing the respective base colour tone of the two surfaces or sections of surface compared with one another. Within a surface or a section of surface of the respective layer, by way of example within a section of surface of the main body or within a section of surface of the decorative base material or within a section of surface of the final decoration, the colour distance within tolerance is less than 2.5 ΔE, preferably less than 2 ΔE, particularly preferably less than 1.5 ΔE.

With such a short colour distance a difference in colour is hardly noticeable, if at all, with the naked eye (known as an "imperceptible colour difference"). As stated, it is a case here of colour differences within tolerance, which can generally hardly be avoided; ideally the respective surface or respective section of surface is single colour, however. This applies in particular to the decorative base material, which is preferably single colour, but within tolerance as before can exhibit a colour difference within the surface.

According to a further configuration again of the edge profile of the invention, as indicated above, the decorative base material or the colour of the decorative base material has a greater brightness than the main body or the colour of the main body. Additionally, or alternatively, it is provided that the decorative base material or the colour of the decorative base material has a greater brightness than the final decoration or the colour of the final decorations. The greater brightness of the layer forming the decorative base material has the advantage that by applying the decorative print the final decoration can be optimally matched to a plurality of colours or colour tones of the decoration of the sheet-like material. This applies in particular in the event that the layer forming the decorative print is applied by digital printing or gravure printing.

According to another configuration of the edge profile of the invention it is provided that the colour distance between the first base colour tone and the third base colour tone is less than 2.5 ΔE, preferably less than 2 ΔE, particularly preferably less than 1.5 ΔE. A relatively short colour distance ensures that between the base colour tone of the main body and the base colour tone of the final decoration, formed by overlaying decorative base material and decorative base material, no significant colour differences are noticeable with the naked eye. Since the decorative base material coextruded with the main body can be relatively thin, as described above, a colour difference (colour distance) and a brightness difference between the decorative base material and the adjacent layers hardly arises and the edge profile gives the observer the impression of a uniform colour, even if it has a cut edge, together with the decoration.

According to a further configuration again of the edge profile of the invention, between the decorative print and the decorative base material coextruded with the main body a background is arranged (as a separately applied layer). A background means that which is referred to as a colour-receiving layer, to which colour particles of the layer forming the decorative print adhere or with which they are able to adhere. Such a background is in particular expedient, if the decorative print is applied by means of a digital printing method.

In particular, the background is the only layer between the decorative base material and the decorative print. Basically, however, it is also conceivable to arrange between decorative base material and background at least one primer layer. The latter is in particular expedient if the extrudate, thus the unit comprising main body and decorative base material, involves PP (polypropylene).

According to another configuration again of the edge profile of the invention, on the side of the decorative print turned away from the main body a protective lacquer is arranged as a further layer.

Again, according to a further configuration of the edge profile of the invention, it is provided that the background and/or the primer layer and/or the protective lacquer is colourless (i.e. achromatic or not coloured) and/or transparent.

According to another configuration of the edge profile of the invention, the decorative print is a layer created by a gravure printing method or a digital printing method.

Finally, according to another configuration of the edge profile of the invention the plastic, of which the main body and/or the decorative base material is formed, is ABS (acrylonitrile butadiene styrene), PP (polypropylene), PVC (polyvinylchloride), PMMA (polymethylmethacrylate) or PET (polyethylene terephthalate). It is preferable here if the main body and the decorative base material are made from the same plastic. Basically, however, it is also conceivable to use for the decorative base material other plastics or modified plastics with the same basis as the main body. Using another or a modified plastic offers the possibility of optimising the adherence of the subsequent layers. In particular by introducing polar molecules such as for example polymers modified by maleic acid anhydride such an improvement is achievable and economically feasible.

The object derived and presented above is further achieved according to a second teaching of the present invention with a sheet-like material, in particular a wood-based, compact or plastic sheet with a top, with a bottom, and with at least one narrow side, in that the at least one narrow side is edged (glued) with an edge profile as defined above.

A wood-based panel is in particular a chipboard, fibreboard, OSB or lightweight board (a board with top layers in wooden material and a light ply in between). A compact board is a board is a board with a number of layers of core papers soaked in phenol resin, having a decorative paper impregnated with melamine resin on at least one side, wherein the layers coated in this way are pressed under high pressure and at high temperature to form a compact board. The basic properties, test specifications and requirements relating to these boards, known as high-pressure laminates (HPL), are defined in European standards EN 438 Parts 1-7. A plastic board is in particular a flat body in a thermoplastic or duroplastic plastic.

To apply the edge profile to the respective narrow side of the sheet-like material, the underside of the main body, that is to say the side turned away from the decorative base material, is provided with a melting layer, in particular a melting layer with a thermoplastic plastic base. The melting layer is, by way of example, applied in the form of a coextruded or post-coextruded layer or as a separate coating to the main body. Before or during the edging or the associated pressing of the edge profile against the narrow side the melting layer is preferably activated. The melting layer is preferably activated by means of a high-energy radiation such as IR (infrared), in particular NIR (near infrared), laser and/or plasma radiation, or by means of hot air.

According to a configuration of the sheet-like material, the edge profile has at least one cut edge, the surface of which runs transversally to the orientation of all layers of the layered structure of the edge profile, wherein the surface of the main body forms a section of the surface of the cut edge. Such a cut edge results in particular from removal of an overhanging part of the edge profile, in particular once this has been joined to the narrow side of the sheet-like material. Such a section can project from the top and/or bottom of the sheet-like material, if an edge profile is glued to the narrow side and is wider than the narrow side. A cut edge can also result, however, from the main body being extruded together with the decorative base material as a single extrudate that is many times the width of the narrow side of the sheet-like material, so that this extrudate is divided up lengthways before or after application of the further layers.

According to a further configuration of the sheet-like material of the invention, it is provided that the top and/or bottom of the sheet-like material is coated with a coating having a decoration on it, which (at least in sections, in particular in a section bordering the narrow side with the edge profile) has a fourth base colour tone, wherein the colour distance between the first base colour tone and the fourth base colour tone and/or between the third base colour tone and the fourth base colour tone is shorter than 2.5 ΔE, preferably shorter than 2 ΔE, particularly preferably shorter than 1.5 ΔE. In this way, to the observer no colour differences or colour tone differences between the individual surfaces or base colour tones are noticeable with the naked eye. When the sheet-like material and the edge profile are viewed together a uniform colour impression results.

BRIEF DESCRIPTION OF THE DRAWINGS

There are now a number of possibilities for arranging and developing the edge profile of the invention and the sheet-like material of the invention. In this regard reference is made to the description of exemplary embodiments in connection with the drawing. In the drawings.

DESCRIPTION OF THE INVENTION

Figure 1:
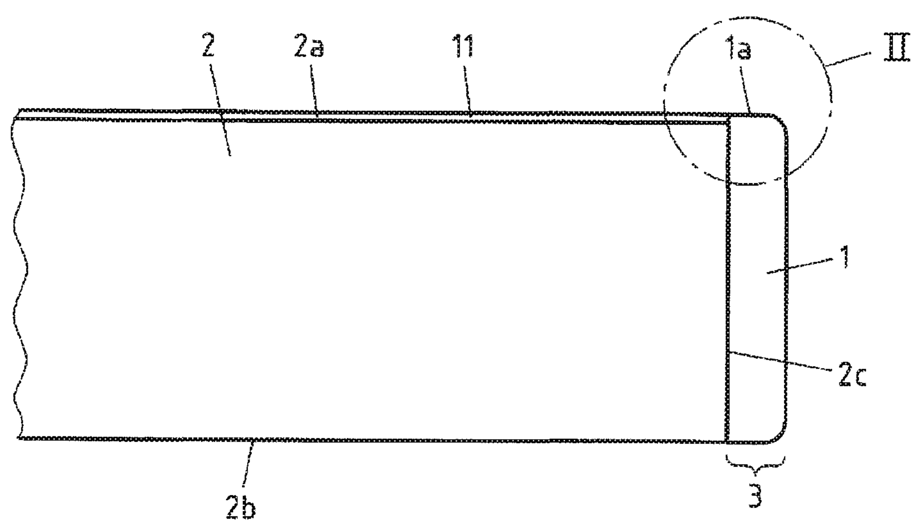
FIG. 1 shows a schematic sectional view of a sheet-like material according to the present invention.

FIG. 1 shows as an example of a sheet-like material a wood-based panel 2 with a laterally applied edge profile 1. The wood-based panel 2 has a top 2*a*, a bottom 2*b* and four narrow sides 2*c*, of which only one is shown. The edge profile 1 is edged or glued to the narrow side 2*c* shown.

Figure 2A:
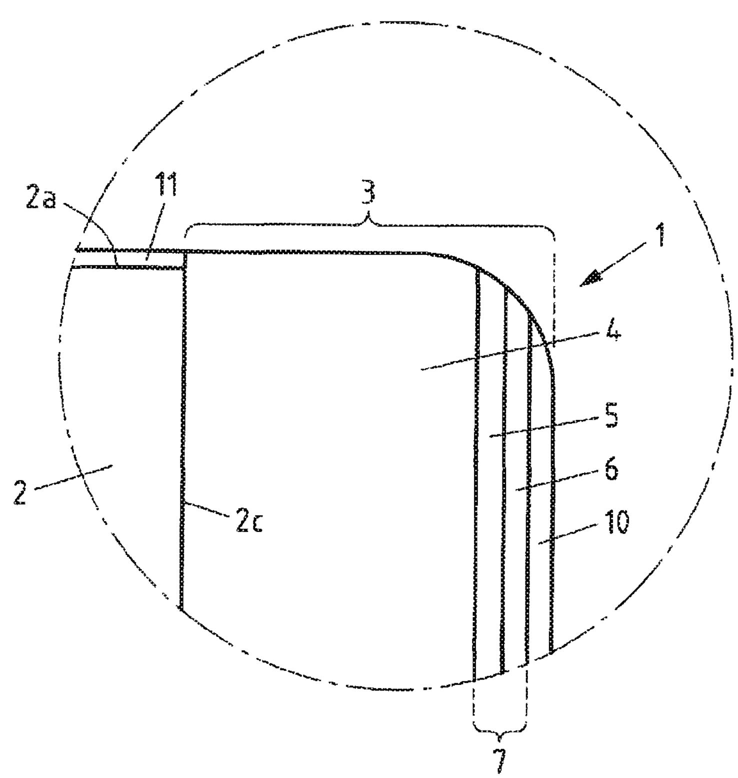
FIG. 2*a* shows the detail II from FIG. 1 in an enlarged representation with a first exemplary embodiment of an edge profile of the invention.

The edge profile 1 has, as shown in FIGS. 2*a*)-*d*), a layered structure 3, which according to the invention always has a main body 4 made of plastic, a decorative base material 5 similarly made of plastic and a decorative print 6 as layers. Additionally, in the exemplary embodiments a further layer of protective lacquer 10 is always applied to the decorative print 6.

The main body 4 has a first base colour tone and is produced with the decorative base 5, which has a brighter second base colour tone, by coextrusion. The main body 4 serves for gluing with the narrow side 2*c* of the wood-based panel. The decorative base material 5 serves for direct or indirect application of a decorative print 6, wherein decorative base material 5 and decorative print 6 (seen perpendicularly to the orientation of the layers) together form a final decoration 7, which has a third base colour tone. The third base colour tone is less bright than the second base colour tone.

The colour distance between first base colour tone and third base colour tone is intended to be as short as possible and is in particular less than 2.5 ΔE, here by way of example 1 ΔE. In contrast, the colour distance between the first base colour tone and the second base colour tone, just like the colour distance between the second base colour tone and the third base colour tone, is significantly longer and is in particular in a range of 2 to 8 ΔE, here by way of example 5 ΔE.

The layer co-extruded with the main body 4, that is to say the decorative base material 5, in particular has a maximum layer thickness here in a range of 3 to 500 μm, by way of example of 15 μm.

Furthermore, in all exemplary embodiments at least the top 2*a* of the wood-based panel 2 is coated with a coating 11 having a decoration, by way of example with a decorative film 11, having a fourth base colour tone. The colour distance between this fourth base colour tone and the first base colour tone and/or third base colour tone is relatively short and is in particular less than 2.5 ΔE, by way of example 1 ΔE. The colour distance between the fourth base colour tone and the second base colour tone, on the other hand, is relatively long and is in a range of 2 to 8 ΔE by way of example 5 ΔE. The advantage of the colour distances selected in this way is that a cut edge 1*a* provided on the edge profile 1, the surface of which runs transversally to the orientation of all layers of the layered structure 3, does not result in any colour differences noticeable with the naked eye between edge profile 1 and coating 11 of the wood-based panel 2.

In the following, the structure of the edge profile 1 according to the exemplary embodiments in FIGS. 2*a*)-2*d*) is now described in more detail.

The multi-layered edge profile 1 in FIG. 2*a*) has an extruded main body 4 and a decorative base material 5 coextruded with it, wherein main body 4 and decorative base material 5 are arranged directly adjacent to each other and here are made from ABS. Directly on the decorative base material 5 here by means of a gravure printing method decorative print 6 is applied, which is externally sealed by a protective lacquer 10. Further layers are not provided.

Figure 2B:
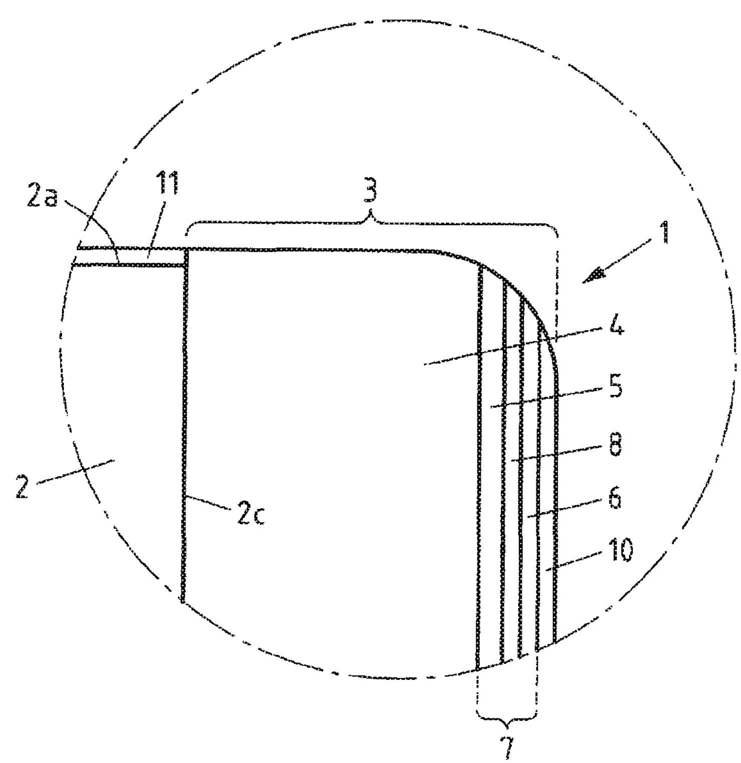
FIG. 2*b* shows the detail II from FIG. 1 in an enlarged representation with a second exemplary embodiment of an edge profile of the invention.

The exemplary embodiment in FIG. 2*b*) is based on the same structure of the edge profile 1 as in FIG. 2*a*), wherein here the difference is, however, that between the decorative base material 5 and the decorative print 6, a background (colour-receiving layer) 8 is arranged as a further layer. A further difference in this exemplary embodiment is that the layer formed by the decorative print 6 is produced by a digital printing method. As an alternative to ABS, the plastic of main body 4 and decorative base material 5 can also be PP. Further layers are not provided for.

Figure 2C:
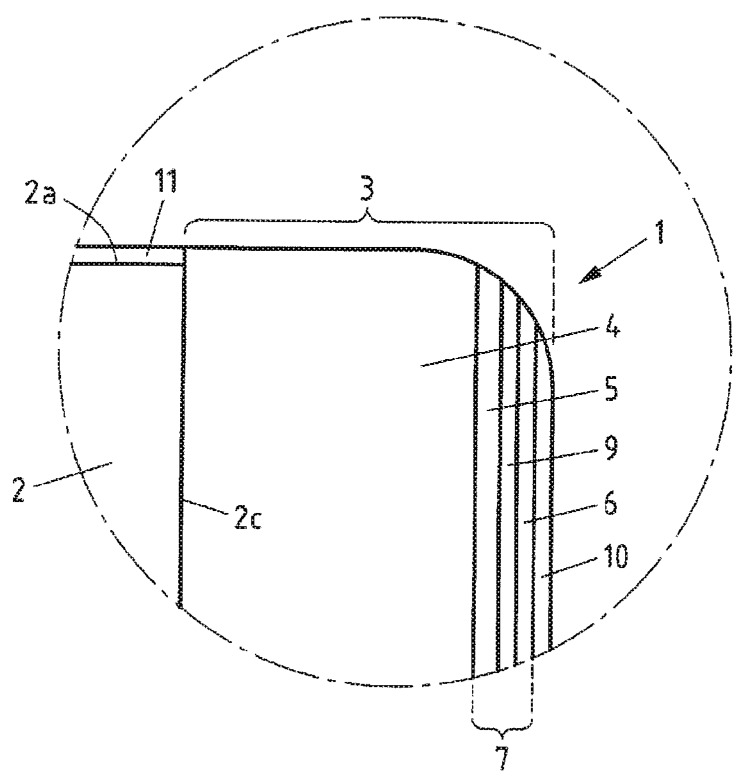
FIG. 2*c* shows the detail II from FIG. 1 in an enlarged representation with a third exemplary embodiment of an edge profile of the invention.

In the exemplary embodiment in FIG. 2*c*) a main body 4 is similarly co-extruded with a decorative base material 5. In this case, the material of main body 4 and decorative base material 5 involved is PP. The decorative print 6 is not applied directly to the decorative base material 5 here, but between decorative base material 5 and decorative print 6 an additional primer layer 9 is provided. The decorative print 6 is applied by means of a gravure printing method directly to the primer layer 9.

Figure 2D:
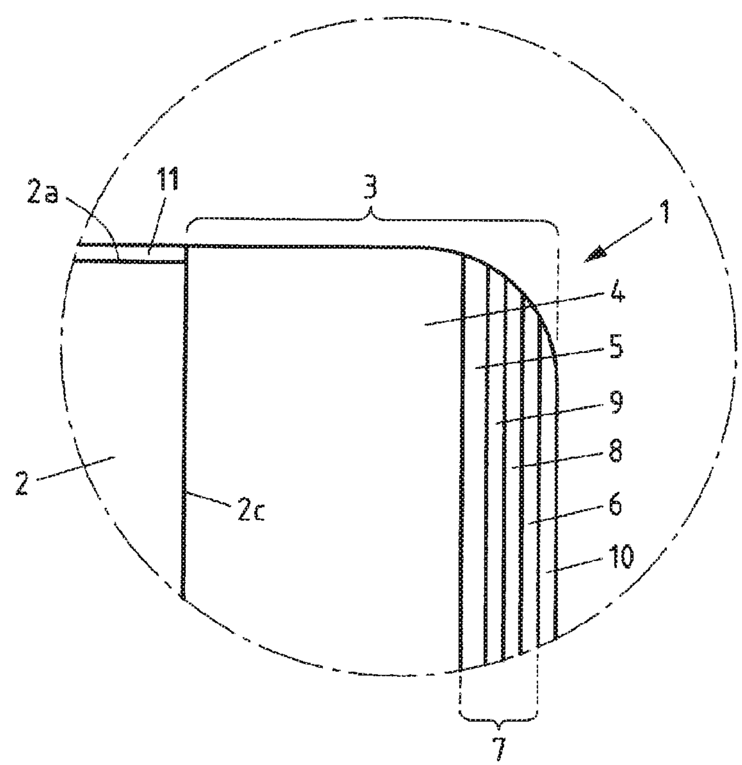
FIG. 2*d* shows the detail II from FIG. 1 in an enlarged representation with a fourth exemplary embodiment of an edge profile of the invention.

In the exemplary embodiment in FIG. 2*d*) the same structure as in FIG. 2*c*) is used as a basis. The difference here, however, is that in addition between the primer layer 9 and the decorative print 6 a further background (colour-receiving layer) 8 is arranged. In contrast to FIG. 2*c*), in the exemplary embodiment of FIG. 2*d*), the decorative print 6 is furthermore applied by means of a digital printing method. Apart from a protective lacquer 10 no further layers are provided for.

The invention claimed is:

1. An edge profile for a sheet-like material, comprising a layered structure:

with a main body made of plastic, which has a first base colour tone, with a decorative base material, which has a second base colour tone, and with a decorative print, wherein a final decoration, which has a third base colour tone, is formed at least from the decorative base material and the decorative print, wherein the decorative base material is a layer arranged between the main body and the decorative print, wherein the decorative base material is a layer made of plastic coextruded with the main body, wherein the decorative base material and the main body are positioned adjacent to one another so as to be in contact with one another when coextruded together, wherein the decorative base material and the main body are formed as a single piece from an extrusion die, and wherein the decorative base material has a greater brightness than the main body, the final decoration, or the main body and the final decoration.

2. The edge profile according to claim 1, wherein the decorative base material coextruded with the main body has a layer thickness in a range of 3-500 μm.

3. The edge profile according to claim 2, wherein the layer thickness is in a range of 5-30 μm.

4. The edge profile of claim 2, wherein the colour distance between the first base colour tone and the second base colour tone, the colour distance between the second base colour tone and the third base colour tone, or the colour distance between the first base colour tone and the second base colour tone and the colour distance between the second base colour tone and the third base colour tone is in a range of 2-8 ΔE.

5. The edge profile of claim 1, wherein the colour distance between the first base colour tone and the second base colour tone, the colour distance between the second base colour tone and the third base colour tone, or the colour distance between the first base colour tone and the second base colour tone and the colour distance between the second base colour tone and the third base colour tone is in a range of 2-8 ΔE.

6. The edge profile according to claim 5, wherein the colour distance is in a range of 2.5-4 ΔE.

7. The edge profile according to claim 1, wherein the colour distance between the first base colour tone and the third base colour tone is shorter than 2.5 ΔE.

8. The edge profile according to claim 7, wherein the colour distance is shorter than 1.5 ΔE.

9. The edge profile according to claim 1, wherein between the decorative print and the decorative base material coextruded with the main body a background is arranged.

10. The edge profile according to claim 9, wherein the background is the only layer between the decorative base material and the decorative print.

11. The edge profile according to claim 9, wherein between the decorative base material and the background at least one primer layer is arranged.

12. The edge profile according to claim 9, wherein the background, the primer layer, the protective layer, or the background, the primer layer, and the protective layer are colourless, transparent, or colourless and transparent.

13. The edge profile according to claim 1, wherein on the side of the decorative print turned away from the main body a protective lacquer is arranged as a further layer.

14. The edge profile according to claim 1, wherein the decorative print is a layer produced by a gravure printing method, a digital printing method, or a gravure and digital printing.

15. The edge profile according to claim 1, wherein the plastic from which the main body, the decorative base material, or the main body and the decorative base material is made is ABS, PP, PVC, PMMA or PET.

16. A sheet-like material:

with a top, with a bottom, and with at least one narrow side, wherein the at least one narrow side is edged with the edge profile of claim 1.

17. The sheet-like material according to claim 16, wherein the edge profile has a cut edge, the surface of which runs transversally to the orientation of all layers of the layered structure of the edge profile, wherein a surface of the main body forms a section of the surface of the cut edge.

18. The sheet-like material according to claim 16, wherein the top, bottom, or top and bottom of the sheet-like material is coated with a coating having a decoration on it, which has a fourth base colour tone, wherein the colour distance between the first base colour tone and the fourth base colour tone, the colour distance between the third base colour tone and the fourth base colour tone, or the colour distance between the first base colour tone and the fourth base colour tone and the colour distance between the third base colour tone and the fourth base colour tone is shorter than 2.5 ΔE.

19. The sheet-like material according to claim 18, wherein the colour distance is shorter than 1.5 ΔE.

* * * * *

UNITED STATES PATENT AND TRADEMARK OFFICE

CERTIFICATE OF CORRECTION

PATENT NO. : 11,021,006 B2
APPLICATION NO. : 15/766468
DATED : June 1, 2021
INVENTOR(S) : Thomas Streichardt It is certified that error appears in the above-identified patent and that said Letters Patent is hereby corrected as shown below:

In the Claims

Column 10, Line 30, Claim 14, delete "printing." and insert -- printing method. --

Column 10, Line 34, Claim 15, delete "is made is" and insert -- is made of --

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*